United States Patent [19]
Yamazaki

[11] Patent Number: 5,504,594
[45] Date of Patent: Apr. 2, 1996

[54] HOLOGRAM, ARTICLE INCLUDING HOLOGRAM, AND HOLOGRAM RECORDING AND RECONSTRUCTING METHODS

[75] Inventor: Satoshi Yamazaki, Tokyo, Japan

[73] Assignee: Dai Nippon Printing Co., Ltd., Tokyo, Japan

[21] Appl. No.: 208,808

[22] Filed: Mar. 10, 1994

Related U.S. Application Data

[63] Continuation of Ser. No. 978,525, Nov. 19, 1992, abandoned.

[30] Foreign Application Priority Data

Nov. 20, 1991 [JP] Japan ................................ 3-304522

[51] Int. Cl.⁶ .............................. G02B 5/32; G03H 1/22; G06K 7/10; G06K 9/74
[52] U.S. Cl. ............................... 359/2; 235/457; 283/86; 359/32; 356/71
[58] Field of Search .................... 359/2, 23, 25, 359/32; 235/457; 356/71; 283/86

[56] References Cited

U.S. PATENT DOCUMENTS

| | | | |
|---|---|---|---|
| 4,108,367 | 8/1978 | Hannan | 359/2 |
| 4,568,141 | 2/1986 | Antes | 359/2 |
| 4,641,017 | 2/1987 | Lopata | 235/457 |
| 4,731,772 | 3/1988 | Lee | 359/19 |
| 4,820,006 | 4/1989 | Constant | 359/2 |
| 4,945,215 | 7/1990 | Fukushima et al. | 235/457 |
| 5,059,776 | 10/1991 | Antes | 359/2 |
| 5,101,184 | 3/1992 | Antes | 235/457 |
| 5,444,225 | 8/1995 | Takahashi et al. | 359/2 |

FOREIGN PATENT DOCUMENTS

| | | | |
|---|---|---|---|
| 60-83074 | 5/1985 | Japan | 359/2 |
| 60-168279 | 8/1985 | Japan | 235/457 |
| 62-283384 | 12/1987 | Japan | 359/2 |

*Primary Examiner*—Martin Lerner
*Attorney, Agent, or Firm*—Dellett and Walters

[57] ABSTRACT

A method of reconstructing a hologram (1) recorded so that an image of a plurality of parallel bar-shaped patterns (3) is reconstructed. An image of the bar-shaped patterns (3) is reconstructed by using reconstructing light (2) having an incident region (A) in which a diameter in a direction parallel to the bar-shaped patterns (3), which are to be reconstructed by the hologram (1), is larger than a diameter in a direction intersecting perpendicularly to them. Even if a read sensor (4) is disposed in an out-of-focus position, the hologram (1) can be reconstructed with relatively high resolving power. Thus, the method minimizes restrictions on the position of the read sensor (4) and lowering of the read accuracy.

16 Claims, 2 Drawing Sheets

5,504,594

HOLOGRAM, ARTICLE INCLUDING HOLOGRAM, AND HOLOGRAM RECORDING AND RECONSTRUCTING METHODS

This is a continuation of application(s) Ser. No. 07/987,525 filed on Nov. 19, 1992 now abandoned.

BACKGROUND OF THE INVENTION

The present invention relates to a machine readable hologram containing the record of parallel bar-shaped patterns, like bar code patterns, and also to methods of recording and reconstructing such a hologram. More particularly, the present invention relates to a hologram which can be reconstructed effectively with fewer restrictions on the position of a read sensor, which reads a reconstructed image of the hologram, and with a minimal lowering in the read accuracy even if the read sensor is a little out of position. Further, the present invention relates to an article including such a hologram, and also to improved hologram recording and reconstructing methods.

It is a known practice to form a bar code into a hologram and illuminate it with a laser beam for reconstruction that has a small beam diameter to thereby read the recorded bar code (for example, see Japanese Patent Application Laid-Open (KOKAI) No. 1-142784 (1989)).

However, no consideration has heretofore been given to the relationship between the direction of the bars of a bar code which is to be recorded and reconstructed and the direction of incidence of reference light at the time of recording and that of reconstructing light at the time of reading, and no attempts have been made to specify the direction of the bars and the direction of such incident light in connection with each other. Therefore, there are many restrictions on the position of a read sensor that reads a reconstructed image of the bar code. If the read sensor is not disposed in the required position, particularly in terms of the direction of propagation of the diffracted light, the bar code cannot be read accurately.

SUMMARY OF THE INVENTION

In view of the above-described problems of the prior art, it is an object of the present invention to provide a hologram which contains the record a pattern of parallel bar-shapes, like a bar code pattern, and which can be reconstructed effectively with fewer restrictions on the position of a read sensor, and with a minimal lowering in the read accuracy even if the read sensor is disposed a little out of position, and also provide an article including such a hologram and hologram recording and reconstructing methods.

To attain the above-described object, the present invention provides a method of reconstructing a hologram recorded so that an image of a pattern of a plurality of parallel bar-shapes is reconstructed, characterized in that an image of the pattern is reconstructed by using reconstructing light having an incident region in which a diameter in a direction parallel to the bar-shapes, which are to be reconstructed by the hologram, is larger than a diameter in a direction intersecting perpendicularly to them.

The hologram may be reconstructed by making the reconstructing light obliquely incident on the surface of the hologram. The reconstructing light may be a laser beam from a semiconductor laser.

In addition, the present invention provides a method of recording a hologram in which a pattern of a plurality of parallel bar-shapes is recorded by using reference light that is made obliquely incident onto the surface of the hologram, characterized in that the angle between a first plane containing incident rays of reference light and a line normal to the surface of the hologram with respect to a second plane containing a bar-shape of the pattern to be recorded and a line normal to the surface of the hologram is not greater than 45°.

In addition, the present invention provides a hologram which is recorded so that an image of a plurality of parallel bar-shaped patterns is reconstructed by using reconstructing bar-shaped patterns is reconstructed by using reconstructing light that is made obliquely incident on the surface of the hologram, characterized in that the angle between a plane containing incident rays of reconstructing light and a line normal to the surface of the hologram and a plane containing a bar-shaped pattern to be reconstructed and a line normal to the surface of the hologram is not greater than 45°.

In addition, the present invention provides a hologram in which a plurality of parallel bar-shaped patterns are recorded by using reference light that is made obliquely incident on the surface of the hologram, characterized in that the angle between a plane containing incident rays of reference light and a line normal to the surface of the hologram and a plane containing a bar-shaped pattern to be recorded and a line normal to the surface of the hologram is not greater than 45°.

In these cases, a bar code may be recorded as the bar-shaped patterns.

In addition, the present invention provides an article including any one of the holograms described above.

In the present invention, the hologram is reconstructed by using light having an incident region in which a diameter in a direction parallel to the bar-shaped patterns, which are to be reconstructed by the hologram, is larger than a diameter in a direction intersecting perpendicularly to them. Therefore, the depth of focus can be increased in the direction intersecting perpendicularly to the bar-shaped patterns, which are to be reconstructed by the hologram, so that the resolving power can be improved. Accordingly, the hologram and hologram reconstructing method of the present invention are even more practical and particularly suitable for recording and reproducing bar codes.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principles and embodiments of the hologram and hologram reconstructing method according to the present invention will be described below with reference to the accompanying drawings.

Figure 1:
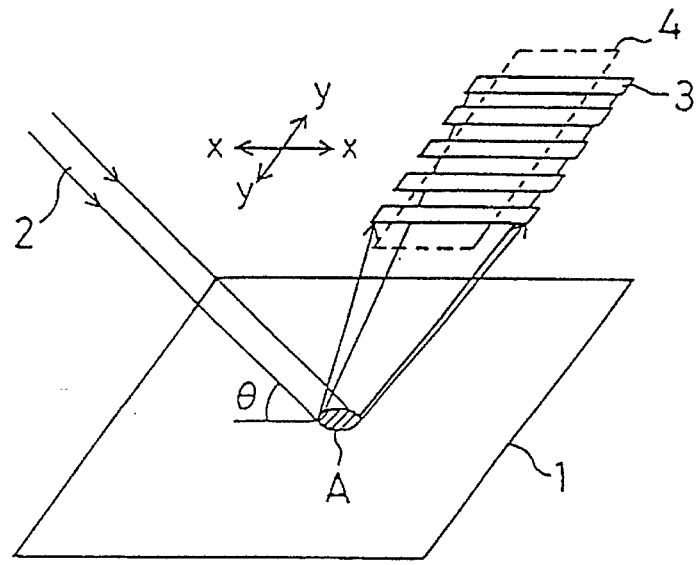
FIG. 1 is a perspective view showing the way in which a hologram according to the present invention is reconstructed.

Referring to FIG. 1, which is a perspective view showing the way in which a hologram 1 according to the present invention is reconstructed, the hologram 1 is illuminated with reconstructing light 2 having a small beam diameter, which is made obliquely incident on the surface of the hologram 1 at an angle θ (θ<90°), to thereby reconstruct an image of a plurality of parallel bar-shaped patterns 3. The patterns 3 are read with a line sensor 4, for example, which is disposed so as to intersect the parallel bar-shaped patterns 3. Each bar-shaped pattern 3, which is to be reconstructed, has been recorded so as to extend in the direction x—x, shown in the figure, that is, in a direction which is parallel to the plane of incidence of the reconstructing light 2 (i.e., the plane that contains the incident ray and the line normal to the surface of the hologram 1).

Figure 2:
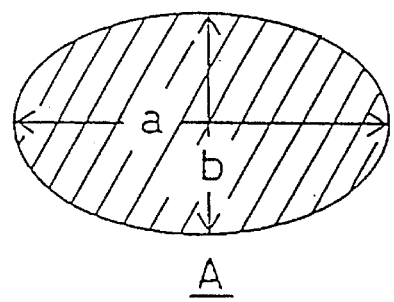
FIG. 2 is a plan view showing the shape of a region of the hologram on which reconstructing light is made incident.

In a case where the bar-shaped patterns 3 are recorded so that the reconstructing light 2 is made obliquely incident on the surface of the hologram 1, the reconstructing light 2 is incident on an elliptical region A of the hologram 1, such as that shown in FIG. 2. In this case, the diameter of the elliptical region A is relatively long (major axis a) in the direction of incidence of the reconstructing light 2 and relatively short (minor axis b) in a direction perpendicular to the incident direction. When the region A, where diffracted light emerges from the hologram 1 to form an image of the bar-shaped patterns 3, is relatively short in terms of diameter in the direction perpendicular to the bar-shaped patterns 3, as in the illustrated example, the depth of focus increases, so that even if the line sensor 4 is disposed on a plane F' which is off from the original imagery plane F, as shown in the sectional view of FIG. 3(a), which is taken along a plane that is perpendicular to the bar-shaped patterns 3 and intersects the region A, the patterns 3 are read as distinguishably separated lines. Therefore, it is possible to prevent occurrence of a read error.

Figures 3A, 3B:
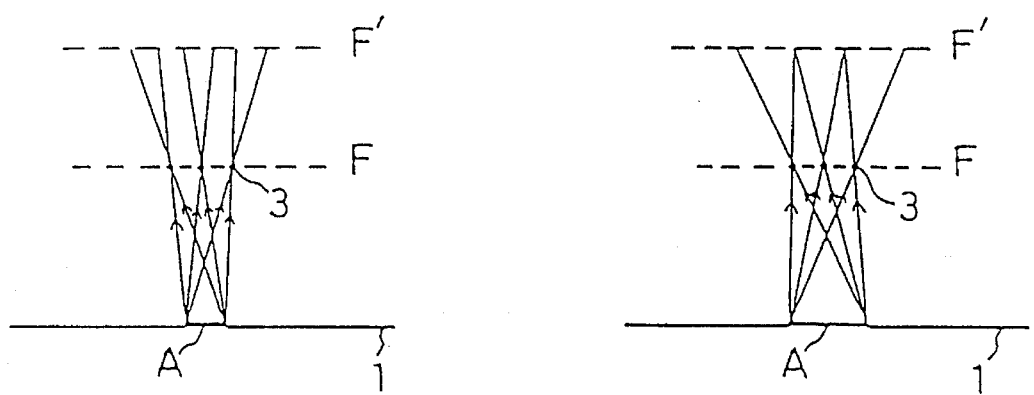
FIGS. 3(a) and 3(b) illustrate how the resolution of the reconstructed image depends on the direction of the bar-shaped patterns.

On the other hand, if the bar-shaped patterns 3 are recorded so that each pattern 3 extends in the direction y—y, shown in FIG. 1, that is, in a direction perpendicular to the plane of incidence of the reconstructing light 2, the region A, where diffracted light 1 emerges from the hologram 1 to form an image of the bar-shaped patterns 3, becomes longer in terms of diameter in the direction perpendicular to the bar-shaped patterns 3. As a result, the focal depth decreases, as shown in FIG. 3(b). Accordingly, if the line sensor 4 is disposed on the plane F', which is off from the imagery plane F, light rays which form respective images of adjacent patterns 3 mix together, so that it becomes impossible to read the adjacent patterns 3 as distinguishably separated lines, resulting in a read error.

In the meantime, the focal depth becomes longer as the region A, where diffracted light emerges from the hologram 1 to form an image of the bar-shaped patterns 3, is reduced in size, but the resolving power lowers because the resolution line width d, which is the reconstructible line width, is expressed as follows:

$$d = C \cdot \lambda f / D$$

(where $\lambda$: the wavelength of reconstructing light; $f$: the spatial frequency of recorded interference fringes; $D$: the size of the hologram; and $C$: a constant)

Therefore, it is necessary for the region A to have a certain area in order to increase the focal depth without lowering the resolving power.

That is, in the hologram 1, which is recorded so that an image of the parallel bar-shaped patterns 3 is reconstructed by making the reconstructing light 3 obliquely incident on the hologram surface, higher read accuracy is obtained with the bar-shaped patterns 3 recorded in parallel to the plane of incidence of the reconstructing light 2 than with those which are recorded so as to intersect the incident plane. Thus, it will be understood that, with such an arrangement of the bar-shaped patterns 3, it is possible to obtain a hologram which can be reconstructed effectively with a minimal lowering in the read accuracy even if the read sensor is disposed in an out-of-focus position.

Although in the foregoing the reconstructing light 2 is assumed to be parallel rays of a beam, the same principle also applies in a case where the hologram is reconstructed by using divergent light or convergent light.

With regard to the relationship between the major and minor axes a and b of the elliptical region A on which the reconstructing light 2 is incident, the ratio of the major axis a to the minor axis b may be set within the range of $1 < a/b \leq 50$. It is preferable to satisfy the condition of $1.5 \leq a/b \leq 4$. The reason for this is that as the ratio of a/b approaches 1, the effectiveness of the present invention, which is obtained by the fact that the region A is elliptical, lessens, whereas, if the ratio of a/b exceeds 50, the value of b becomes excessively small relatively, resulting in a slit-shaped illuminating region; therefore, a read error is likely to occur due to the influence of a diffraction noise produced by this pattern. With regard to the actual size of the elliptical region A, it is desirable to satisfy the condition of 1 mm<b<a< (the size of the hologram 1). If the value of b is not greater than 1 mm, the region A becomes a slit-shaped illuminating region. Therefore, a read error is likely to occur due to the influence of a diffraction noise produced by the slit-shaped illuminating pattern. If the value of a is not smaller than the size of the hologram 1, a part of the reconstructing light 2 will miss the hologram recording surface. Therefore, there is no sense in the value of a being increased to such an extent. As a practical example, a is 3 mm, and b is 2 mm.

The angle θ of incidence of the reconstructing light 2 may be set in the range of from 15° to 75°. If the angle θ is smaller than 15° or larger than 75°, the size of the read device becomes excessively large. The angle θ is preferably set in the range of from 30° to 60°, most preferably at 45°.

In a case where a plurality of parallel bar-shaped patterns are reconstructed by using a semiconductor laser, for example, in which the cross-sectional configuration of light that is emitted from the light source is elliptical by nature, the reconstructing light does not necessarily need to be made obliquely incident on the hologram surface, but it may be made perpendicularly incident thereon. In such a case, the elliptical illuminating region must be set so that the major axis thereof extends in parallel to the bar-shaped patterns, considering the efficiency of utilization of light. The plane that contains the principal ray of the reconstructing light 2 and the line normal to the surface of the hologram 1 does not necessarily need to be the same as the plane that contains the bar-shaped patterns 3, which are to be reconstructed, and the line normal to the surface of the hologram 1. It is only necessary for these two planes to be at an angle not greater than 45° to each other.

Figure 4:
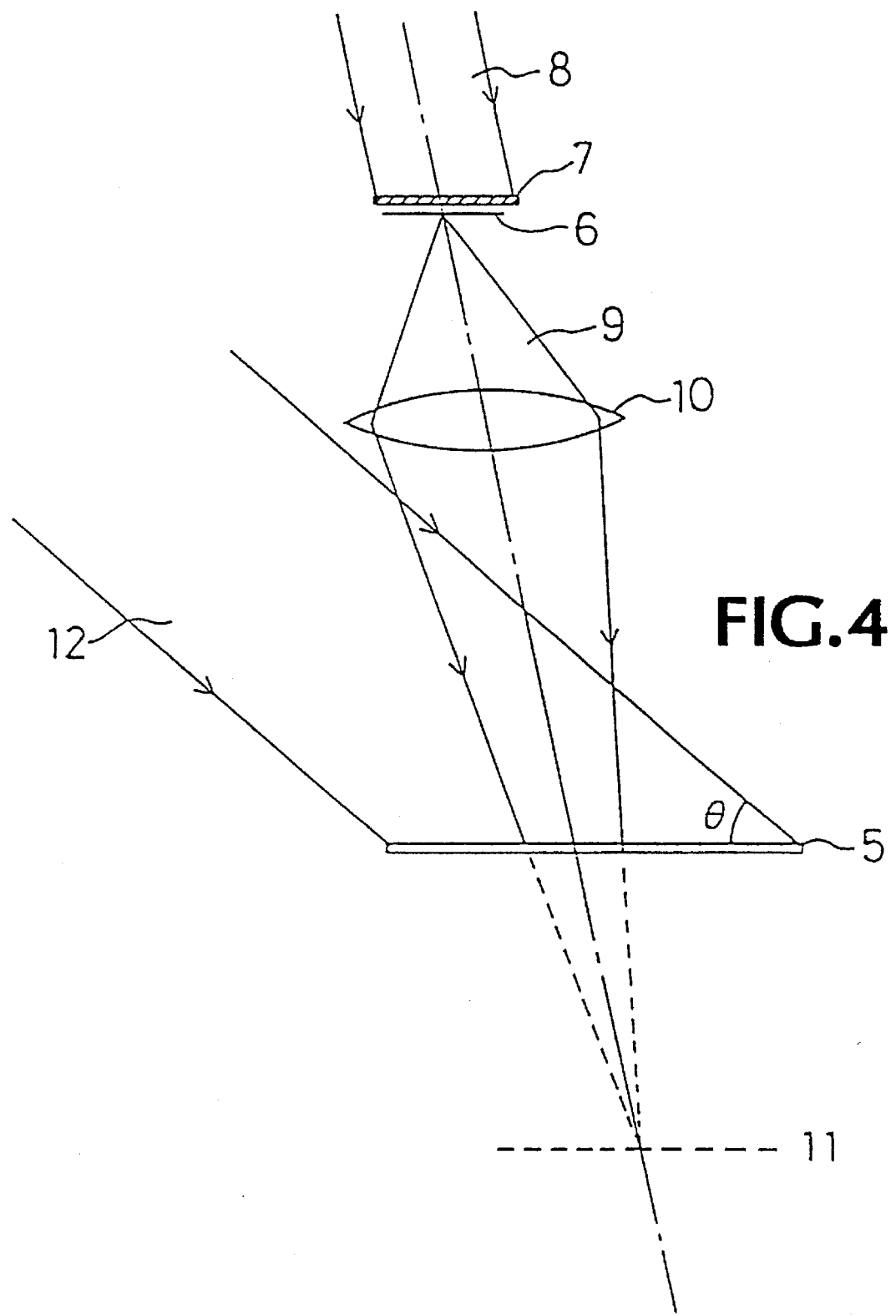
FIG. 4 is an optical path diagram showing an arrangement for photographically recording a hologram.

Incidentally, the hologram 1, as shown in FIG. 1, may be produced by various methods, depending on the kind of hologram. One example of recording of information by using a reflection relief hologram will be explained below. As shown in FIG. 4, which is an optical path diagram, a photosensitive plate 5 coated with a photoresist or the like is used, and a scattering plate 7 is superposed over an aperture plate 6 having bar-shaped pattern openings which are parallel to the plane of the figure. Then, the scattering plate 7 is illuminated with illuminating light 8 from behind. Object light 9 from the aperture plate 6 travels through a lens 10 so as to form an image of the bar-shaped patterns of the aperture plate 6 at a position 11 behind the photosensitive plate 5. In the meantime, reference light 12 is made incident on the photosensitive plate 5 in parallel to the plane of the figure and at the same angle θ as the angle θ at which the reconstructing light 2 is made incident on the surface of the hologram 1, causing an interference with the object light 9 on the surface of the photosensitive plate 5. Thus, interference fringes are recorded. The photosensitive plate 5 is developed to form the interference fringes into relief patterns. Then, the relief surface is plated with a thick film of nickel or the like. Thereafter, the deposited film is removed to use it as a mold, and the relief patterns of the mold are transferred to a transparent resin film. Then, reflective coating is applied to the relief surface of the film having the relief patterns transferred thereto, thereby producing the hologram 1. It should be noted that the position 11 in FIG. 4 is in mirror image relationship to the position of the bar-shaped patterns 3, which are to be reconstructed, as long as the same wavelength is used for both recording and reconstruction.

It should be noted that if the reconstructing light 2 is made incident on the hologram 1 at an angle θ which is different from the angle made between the reference light 12 and the surface of the hologram 1 at the time of recording, the position of the bar-shaped patterns 3 becomes different from the recorded position, causing a trouble in reading with the sensor 4. When the direction of incidence of the reconstructing light 2 deviates in the direction of rotation about the line normal to the surface of the hologram 1, if the angle of deviation is 180° in a relief hologram, for example, there is no great influence on the result of the image reconstruction, that is, the extent of the influence is such that the imagery position of the reconstructed image differs. However, as the angle of deviation approaches 90°, the reconstruction efficiency lowers. Eventually, it becomes impossible to reconstruct an image.

The above-described hologram 1 may be used for various purposes by recording, for example, a bar code thereon. Examples of use application of the hologram 1 include cards, such as credit cards, bank cards, prepaid cards, ID cards, membership cards, licenses, etc., books, such as passports, insurance cards, etc., notes and tickets, such as traveler's checks, gift certificates, admission tickets, etc., securities, such as stock,certificates, government securities, mortgage bonds, etc., and articles worn, such as wristwatches, necklaces, nameplates, rings, earrings, pierced earrings, etc.

Further, it is possible to form on an article another recording part which is machine readable (writable), e.g., a magnetic recording part, an optical recording part, etc. in addition to the hologram 1 so that information that is enciphered by using a scrambler is recorded in the second recording part, with the information recorded in the hologram 1 used as key information. In this case, the information recorded in the second recording part may be reproduced by using the information recorded in the hologram 1 as a key at the time of reading the recorded information.

Examples of a light source which can be suitably used for the reconstructing light 2 are a semiconductor laser and an LED from the viewpoint of size. A He—Ne laser and a mercury-arc lamp are also usable.

Although the hologram and holograph reconstructing method according to the present invention have been described above by way of embodiments, it should be noted that the present invention is not necessarily limited thereto and that various changes and modifications may be imparted thereto.

As will be clear from the foregoing description, with the hologram and hologram reconstructing method according to the present invention, the incident region, on which reconstructing light is made incident, is formed so that a diameter thereof in a direction parallel to the bar-shaped patterns, which are to be reconstructed by the hologram, is larger than a diameter in a direction intersecting perpendicularly to them. Therefore, the hologram reconstructing method will not invite a lowering of the resolving power. Even if a read sensor that reads a reconstructed image of the bar-shaped patterns is disposed in an out-of-focus position, the lowering of the read accuracy is minimized. Thus, there are fewer restrictions on the position of the read sensor. Accordingly, the hologram and hologram reconstructing method of the present invention are even more practical and particularly suitable for recording and reproducing bar codes.

What we claim is:

1. A method of reconstructing a hologram recorded so that a like holographic image pattern comprising a plurality of parallel bar-shapes is reconstructed from any region of said hologram, characterized in that the holographic image pattern is reconstructed by illuminating an incident region of said hologram with reconstructing light, said incident region as provided by the reconstructing light having an area smaller than said hologram, and said incident region also having a diameter in a direction parallel to said bar-shapes, as holographically reconstructed therefrom, that is larger than a diameter of said incident region in a direction intersecting perpendicularly to said holographically reconstructed bar-shapes, thereby making a depth of focus in said intersecting direction larger than a depth of focus in said parallel direction.

2. A hologram reconstructing method according to claim 1, wherein said hologram is reconstructed by providing said reconstructing light obliquely incident onto the surface of said hologram.

3. A method according to claim 2 wherein an azimuth angular relationship between incident rays of the reconstructing light and a line parallel to a bar of said holographically reconstructed bar shapes is not greater than 45°, the reference azimuth axis being normal to the surface of said hologram.

4. A hologram reconstructing method according to claim 1, wherein said reconstructing light is a laser beam from a semiconductor laser.

5. The method according to claim 1 characterized in that said hologram forms an image of said plurality of parallel bar-shapes at a finite distance from said hologram.

6. A method of recording a hologram in which a pattern comprising a plurality of parallel bar-shapes is holographically recorded within said hologram by using reference light that is obliquely incident onto the surface of said hologram, and in which, when said hologram is illuminated with reconstructing light, a like holographic image pattern comprising a plurality of parallel bar-shapes is reconstructed from any region of said hologram, and a depth of focus in a direction intersecting perpendicularly to holographically reconstructed bar-shapes is larger than a depth of focus in a direction parallel to said holographically reconstructed bar-shapes, characterized in that the angle between a first plane, said first plane containing a line parallel to incident rays of the reference light and a line normal to the surface of said hologram, and a second plane, said second plane containing a line parallel to a bar of the bar-shaped pattern being recorded therein via incident light and a line normal to the surface of said hologram, is not greater than 45°.

7. The method according to claim 6 characterized in that said hologram forms an image of said plurality of parallel bar-shapes at a finite distance from said hologram.

8. A hologram which is recorded so that a holographic image pattern comprising a plurality of parallel bar-shapes is reconstructed from said hologram by using reconstructing light that is obliquely incident onto the surface of said hologram, and in which, when said hologram is illuminated with the reconstructing light, a like holographic image pattern comprising a plurality of parallel bar-shapes is reconstructed from any region of said hologram, and a depth of focus in a direction intersecting perpendicularly to holographically reconstructed bar-shapes is larger than a depth of focus in a direction parallel to said holographically reconstructed bar-shapes, characterized in that the angle between a first plane, said first plane containing a line parallel to incident rays of the reconstructing light and a line normal to the surface of said hologram, and a second plane, said second plane containing a line parallel to a bar of the bar-shapes to be reconstructed and a line normal to the surface of said hologram, is not greater than 45°.

9. A hologram according to claim 8 characterized in that said hologram forms an image of said plurality of parallel bar-shapes at a finite distance from said hologram.

10. A hologram in which a pattern comprising a plurality of parallel bar-shapes is recorded within said hologram by using reference light that is obliquely incident onto the surface of said hologram, and in which, when said hologram is illuminated with reconstructing light, a like holographic image pattern comprising a plurality of parallel bar-shapes is reconstructed from any region of said hologram, and a depth of focus in a direction intersecting perpendicularly to holographically reconstructed bar-shapes is larger than a depth of focus in a direction parallel to said holographically reconstructed bar-shapes, characterized in that the angle between a first plane, said first plane containing a line parallel to incident rays of the reference light and a line normal to the surface of said hologram, and a second plane, said second plane containing a line parallel to a bar-shape of the pattern being recorded therein via incident light and a line normal to the surface of said hologram, is not greater than 45°.

11. A hologram according to claim 10 characterized in that said hologram forms an image of said plurality of parallel bar-shapes at a finite distance from said hologram.

12. A hologram according to claim 8 or 10, wherein said pattern comprising a plurality of parallel bar-shapes forms a bar code.

13. An article including a hologram which is recorded so that a holographic image pattern comprising a plurality of parallel bar-shapes is reconstructed from said hologram by using reconstructing light that is obliquely incident onto the surface of said hologram, and in which, when said hologram is illuminated with the reconstructing light, a like holographic image pattern comprising a plurality of parallel bar-shapes is reconstructed from any region of said hologram, and a depth of focus in a direction intersecting perpendicularly to holographically reconstructed bar-shapes is larger than a like holographic image pattern comprising a plurality of parallel bar-shapes is reconstructed from any region of said hologram and a depth of focus in a direction parallel to said holographically reconstructed bar-shapes, characterized in that the angle between a first plane, said first plane containing a line parallel to incident rays of the reconstructing light and a line normal to the surface of said hologram, and a second plane, said second plane containing a line parallel to a bar-shape of the pattern to be reconstructed and a line normal to the surface of said hologram, is not greater than 45°.

14. An article according to claim 13 characterized in that said hologram forms an image of said plurality of parallel bar-shapes at a finite distance from said hologram.

15. An article including a hologram in which a pattern comprising a plurality of parallel bar-shapes is recorded within said hologram by using reference light that is obliquely incident onto the surface of said hologram, and in which, when said hologram is illuminated with reconstructing light, a like holographic image pattern comprising a plurality of parallel bar-shapes is reconstructed from any region of said hologram, and a depth of focus in a direction intersecting perpendicularly to holographically reconstructed bar-shapes is larger than a depth of focus in a direction parallel to said holographically reconstructed bar-shapes, characterized in that the angle between a first plane, said first plane containing a line parallel to incident rays of the reference light and a line normal to the surface of said hologram, and a second plane, said second plane containing a line parallel to a bar-shape of the pattern being recorded therein via incident light and a line normal to the surface of said hologram, is not greater than 45°.

16. An article according to claim 15 characterized in that said hologram forms an image of said plurality of parallel bar-shapes at a finite distance from said hologram.

* * * * *